(12) United States Patent
Chang et al.

(10) Patent No.: US 8,798,582 B2
(45) Date of Patent: Aug. 5, 2014

(54) MOBILE DEVICE HAVING A PROTECTION MECHANISM FOR SENSITIVE INFORMATION

(71) Applicant: Sitronix Technology Corp., Zhubei (TW)

(72) Inventors: Wei-Chung Chang, Zhubei (TW); Chia-Huang Lin, Zhubei (TW); Ming-Huang Liu, Zhubei (TW)

(73) Assignee: Sitronix Technology Corp., Zhubei (TW)

( * ) Notice: Subject to any disclaimer, the term of this patent is extended or adjusted under 35 U.S.C. 154(b) by 0 days.

(21) Appl. No.: 13/707,482

(22) Filed: Dec. 6, 2012

(65) Prior Publication Data

US 2013/0150001 A1    Jun. 13, 2013

(30) Foreign Application Priority Data

Dec. 12, 2011 (TW) .............................. 100223399 U

(51) Int. Cl.
*H04M 1/66* (2006.01)
(52) U.S. Cl.
USPC .................... 455/411; 345/156; 455/418

(58) Field of Classification Search
CPC ....................................................... H04W 4/00
USPC ........................................................... 455/411
See application file for complete search history.

(56) References Cited

U.S. PATENT DOCUMENTS

| | | | |
|---|---|---|---|
| 7,307,228 B2 * | 12/2007 | Wehrenberg | 200/61.49 |
| 2005/0212752 A1 * | 9/2005 | Marvit et al. | 345/156 |
| 2005/0235385 A1 * | 10/2005 | Wehrenberg | D14/125 |
| 2010/0009667 A1 * | 1/2010 | Hasegawa | 455/418 |
| 2011/0109170 A1 * | 5/2011 | Chen et al. | 307/121 |
| 2013/0226754 A1 * | 8/2013 | Boldyrev et al. | 705/35 |

* cited by examiner

*Primary Examiner* — Charles Shedrick
(74) *Attorney, Agent, or Firm* — Rosenberg, Klein & Lee

(57) ABSTRACT

The present invention discloses a mobile phone comprising a gravity sensor, a processor, and a memory. The gravity sensor senses inertia data along a specific direction, the processor couples with the gravity sensor and receives a output signal from the gravity sensor, and the memory stores at least one personal information and operates under the processor's control. When either the gravity sensor or the processor detects a vertical free-fall motion, the processor performs a information security process to lock the personal information to become inaccessible.

25 Claims, 4 Drawing Sheets

MOBILE DEVICE HAVING A PROTECTION MECHANISM FOR SENSITIVE INFORMATION

FIELD OF THE INVENTION

The present invention relates to a mobile device, specifically, relates to a mobile device with information security.

BACKGROUND OF THE INVENTION

Modern society relies on the functionality of mobile devices more and more as the development of the telecommunication technology and the changed habit of the people to hold together their relationship. To draw consumers' attention, other than the common communication functionality, various mobile devices in the market add more fancy ones, and the most popular one among them is the personal information storage functionality which may be implemented through the mass storage space provided by a internal memory and/or a removable memory card. Therefore, those personal information, such as phone books, pictures, text messages, music files, or other types of personal information could be all stored in this space.

However, as the mobile devices get lighter and smaller to become easy for carry, they are inevitably easy to get lost. If this happened, the stored personal information could be accessed or used by others. Thus, it is still needed to improve the information security of the personal information stored in the mobile devices.

SUMMARY OF THE INVENTION

According to an exemplary embodiment of the present invention, a mobile device is provided to lock a personal information to become inaccessible to protect the security of personal information from accessing by others whenever a vertical free-fall motion which is usually happened when the mobile device is getting lost is detected by either a gravity sensor or a processor.

According to another exemplary embodiment of the present invention, a mobile device is provided to send out a predetermined sound, light or other effect to reduce the possibility to lose the mobile device whenever a vertical free-fall motion which is usually happened when the mobile device is getting lost is detected by either a gravity sensor or a processor.

According to another exemplary embodiment of the present invention, a mobile device is provided to send out a warning message or E-mail to notify the user or the client service center where the mobile device is dropped whenever a vertical free-fall motion which is usually happened when the mobile device is getting lost is detected by either a gravity sensor or a processor. Thus, the possibility to retrieve the mobile device is raised.

According to another exemplary embodiment of the present invention, a mobile device comprises a gravity sensor, a processor and a memory. The gravity sensor senses inertia data along a direction, the processor receives the inertia data and performs a free-fall sensing algorithm, and the memory stores at least one personal information under the control of the processor. The processor controls the memory to lock the personal information to become inaccessible whenever a vertical free-fall motion is detected by the free-fall sensing algorithm.

According to another exemplary embodiment of the present invention, a mobile device comprises a gravity sensor, a processor and a memory. The gravity sensor comprises a inertia sensing circuit which senses inertia data along a direction and a free-fall sensing circuit which outputs a interrupt signal according to the inertia data. The memory stores at least one personal information, and the processor receives the interrupt signal and controls the memory according to the interrupt signal. The processor controls the memory to lock the personal information to become inaccessible whenever a vertical free-fall motion is revealed by the interrupt signal.

According to another exemplary embodiment of the present invention, a mobile device comprises a gravity sensor, a processor and a memory. The gravity sensor senses inertia data along a direction, the processor coupling to the gravity sensor receives a signal outputted from the gravity sensor, and the memory stores at least one personal information and operates under the control of the processor. The processor controls the memory to lock the personal information to become inaccessible whenever a vertical free-fall motion is detected by the gravity sensor or the processor according to the inertia data.

The mobile device of the present invention may additionally comprise a wireless transceiving unit and/or a video/audio controlling unit. The wireless transceiving unit and video/audio controlling unit preferably couple to the processor and operate under the processor's control. For example, the wireless transceiving unit could comprise a Wi-Fi protocol module, a global positioning system (GPS), a global system for mobile communications (GSM), a general packet radio service module (GPRS), a 3rd-generation module (3G) or a 4th-generation module (4G); the video/audio controlling unit could comprise a indicator light, a display panel or a speaker, but they are not limited to this example.

The wireless transceiving unit and video/audio controlling unit could assist to notify the owner or the client service center of the mobile device of the falling of the mobile device to reduce the possibility to lost the mobile device. For example, the processor controls the wireless transceiving unit to transmit position data to a predetermined E-mail server or to the wireless transceiving unit of another predetermined mobile device whenever a vertical free-fall motion is detected/revealed. The setting of the E-mail server or the predetermined line/mobile device could be open to the owner or the telecommunication provider, and preferably, setting the owner's personal E-mail address, the phone number of the owner's another mobile device or the owner's family's mobile devices, or the helpline of the telecommunication provider. For example, above mentioned position data could be obtained through a positioning process performed by the wireless transceiving unit under the processor's control. The position data could be transmitted in the form of a text message. The processor could control the video/audio controlling unit to make a display panel or a indicator light blink, or make a speaker send out a predetermined sound effect for warning whenever a vertical free-fall motion is detected/revealed.

It is noted that each unit in the mobile device is not limited to a specific type. For example, the gravity sensor could be chosen from various types of gravity sensors, and preferably, a accelero-micro sensor or a gravity sensor. Aforesaid memory could be chosen from various types of memories, and preferably, a flash memory and/or a memory card. The inertia sensing circuit could be implemented by three single-axis accelerometers or a three-axes accelerometer to sense the inertia in three orthogonal axes, and preferably a integrated chip of a three-axes accelerometer. Above free-fall sensing circuit could be a micro-processor calculating the output signal of the inertia sensing circuit or preferably a integrated chip of a three-axes accelerometer with free-fall detection.

Therefore, it is understood that through either the free-fall sensing circuit or the algorithm of the gravity sensor or the processor, the mobile device of the present invention could determine the occurrence of a vertical free-fall motion according to the sensed inertia data, and then the setting of the personal information is controlled to protect the security of the personal information stored therein.

BRIEF DESCRIPTION OF THE DRAWINGS

Various objects and advantages of the present invention will be more readily understood from the following detailed description when read in conjunction with the appended drawing, in which.

DESCRIPTION OF EMBODIMENTS OF THE INVENTION

Figure 1:
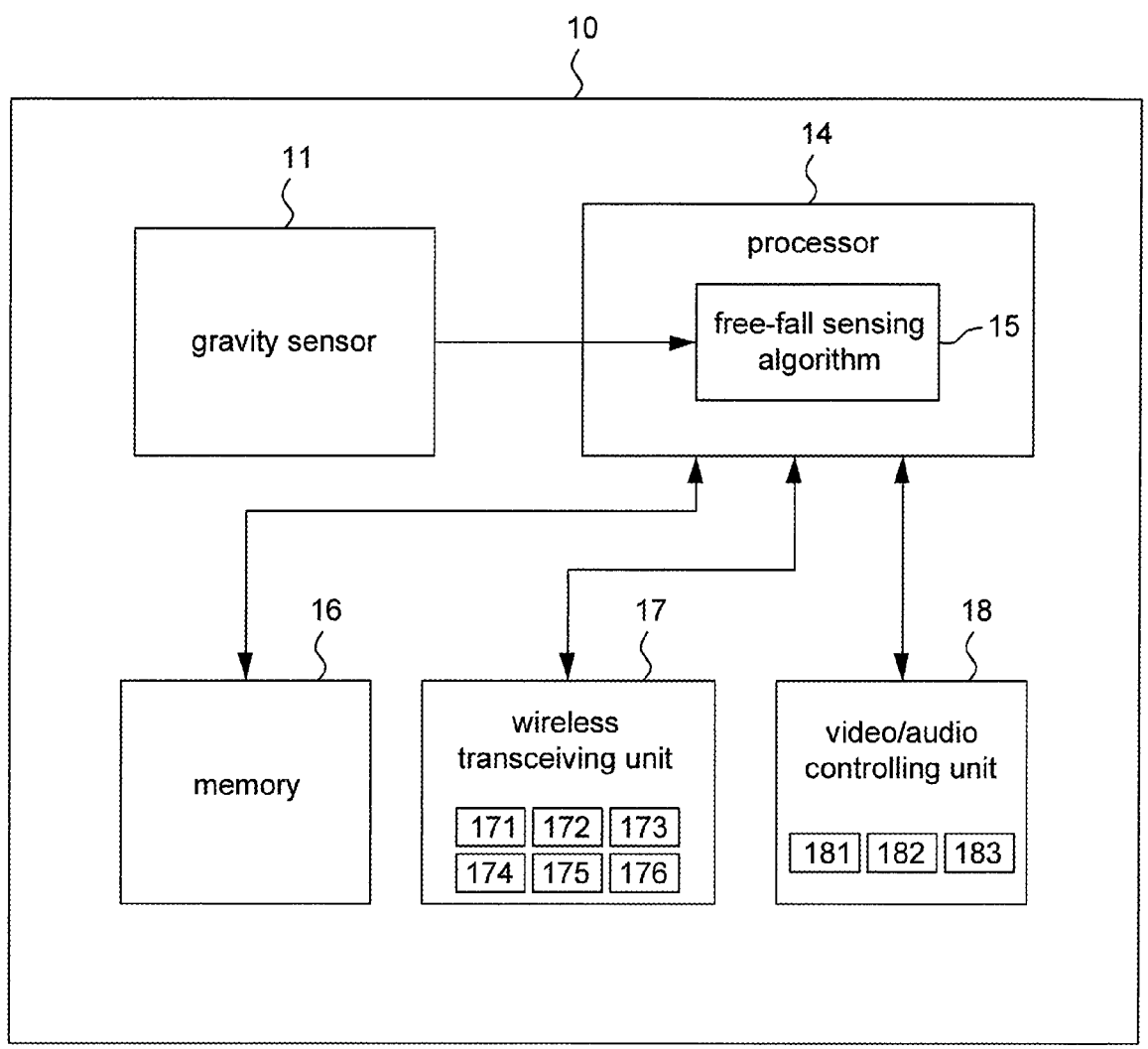
FIG. 1 illustrates a block diagram of a mobile device of an embodiment according to the present invention.
Figure 2:
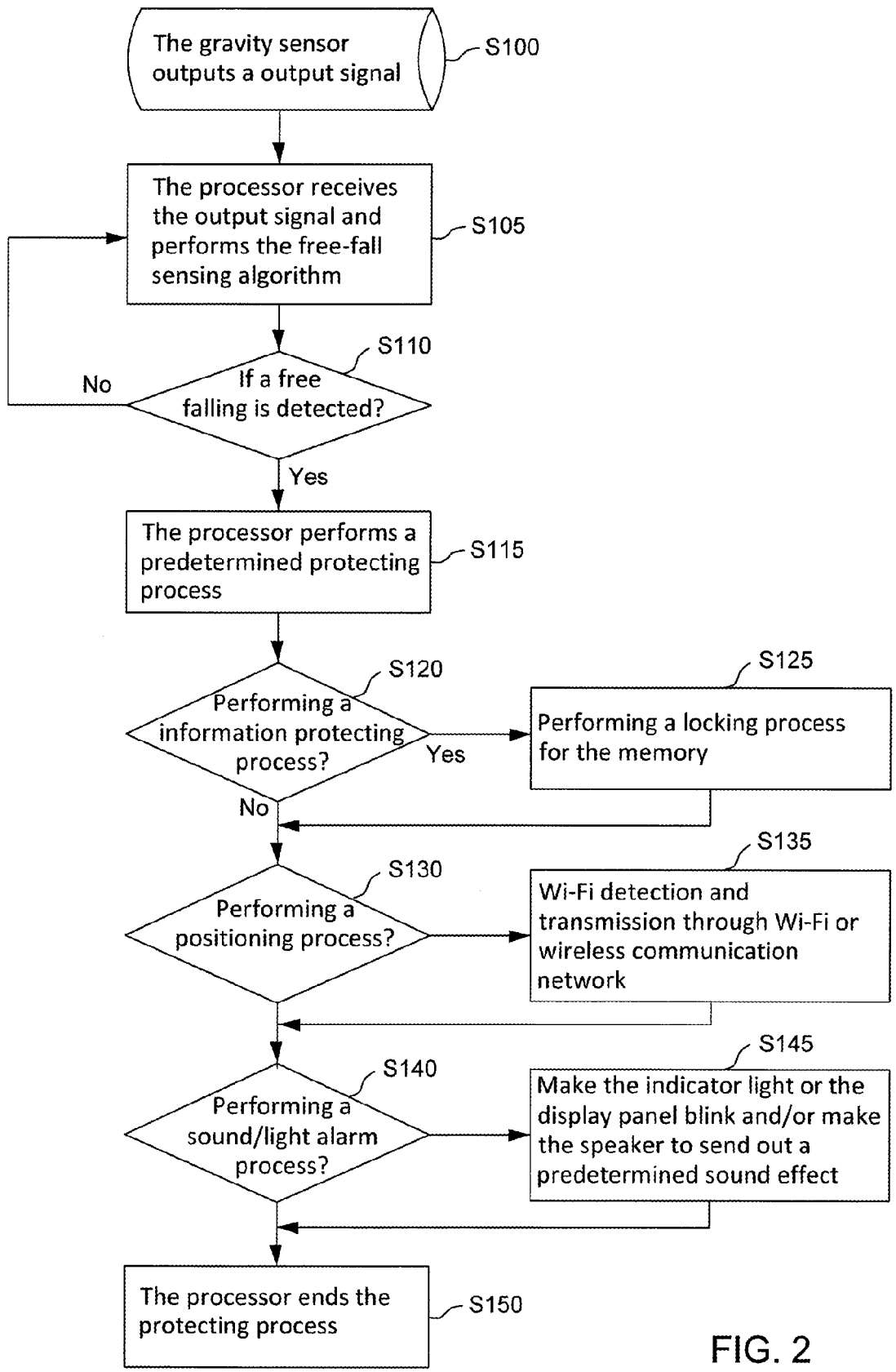
FIG. 2 shows a process flow performed by a mobile device of an embodiment according to the present invention.

Please refer to FIG. 1 and FIG. 2, wherein FIG. 1 illustrates a block diagram of a mobile device of an embodiment according to the present invention, and FIG. 2 shows a process flow performed by a mobile device of an embodiment according to the present invention. The mobile device 10 comprises a gravity sensor 11, a processor 14, a memory 16, a wireless transceiving unit 17 and a video/audio controlling unit 18. The gravity sensor 11 is coupled to the processor 14. The memory 16, the wireless transceiving unit 17 and the video/audio controlling unit 18 are all coupled to the processor 14 to operate under the processor's control.

The gravity sensor 11 outputs a output signal (Step S100). In the present embodiment, the gravity sensor 11 is implemented by an exemplary accelerometer, such as: a accelerometer manufactured by MEMS process, which is able to sense inertia data along a direction, such as the direction and/or the magnitude of the acceleration due to gravity on X, Y or Z axis, and transmit the inertia data in the form of electrical signals to the processor 14.

After the processor 14 receives the electrical signals outputted from the gravity sensor 11, the processor 14 operates according to the output signals to control the memory 16, the wireless transceiving unit 17 and the video/audio controlling unit 18, or processes the output signals to determine if a vertical free-fall motion represents a falling. Briefly speaking, the former is performed majorly by the gravity sensor 11 to detect a vertical free-fall motion, and the later is performed majorly by the processor 14 to detect a vertical free-fall motion. In the present embodiment, taking the later for example, the output signals coming from the gravity sensor 11 could be rendered as the inertia data which could be the input signals to a free-fall sensing algorithm 15 performed in the processor 14. The processor 14 performs the free-fall sensing algorithm 15 (Step S105) to detect a vertical free-fall motion, but the detail steps of the free-fall sensing algorithm 15 are not limited to this example (Step S110).

The exemplary memory 16 used in this embodiment comprises a flash memory and a memory card for storing at least one personal information, such as phone books, pictures, text messages, music files, or other types of personal information.

When either the gravity sensor 11 or the processor 14, taking the processor 14 for example here, detects a vertical free-fall motion is occurred according to the inertia data, the processor 14 controls the memory 16 and performs a predetermined protecting process (Step S115), for example a locking process, to lock above personal information to become inaccessible (Steps S120 and S125).

Additionally, the processor 14 could perform a positioning process (Step S130): controlling the wireless transceiving unit 17 to send out a warning message or E-mail to a predetermined E-mail server or the wireless transceiving unit of another mobile device, such as the personal E-mail address of the owner of the mobile device 10, the phone number of the owner's another mobile device or the owner's family's mobile devices, or the helpline of the telecommunication provider. The warning message or E-mail preferably comprises position data associating to the position where the mobile device 10 falls to increase the possibility to find the mobile device 10 back. The wireless transceiving unit 17 of the present embodiment exemplarily comprises a Wi-Fi protocol module 171, a global positioning system (global positioning system, GPS) 172, a global system for mobile communications (global system for mobile communications, GSM) 173, a general packet radio service module (general packet radio service, GPRS) 174, a 3rd-generation module (3G) 175 and a 4th-generation module (4G) 176. Therefore, the processor 14 controls the wireless transceiving unit 17 to transmit the position data detected by the Wi-Fi protocol module 171 or the global positioning system 172 to the predetermined E-mail address or phone number of other mobile device through the Wi-Fi protocol module 171, $3^{rd}$-generation module 175 or $4^{th}$-generation module 176 (Step S135).

Besides, the processor 14 could preform a sound/light alarm process (Step S140): controlling the video/audio controlling unit 18 to send out a sound/light effect to draw the owner's attention and then urge he/she to pick the mobile device 10 up. Therefore, the possibility to lost the mobile device 10 is reduced. The exemplary video/audio controlling unit 18 used in the present embodiment comprises a indicator light 181, a display panel 182 and a speaker 183, therefore, the processor 14 could control the indicator light 181 and the display panel 182 of the video/audio controlling unit 18 blink and/or make the speaker 183 to send out a predetermined sound effect (Step S145). Then, the processor 14 ends the protecting process (Step S150).

Figure 3:
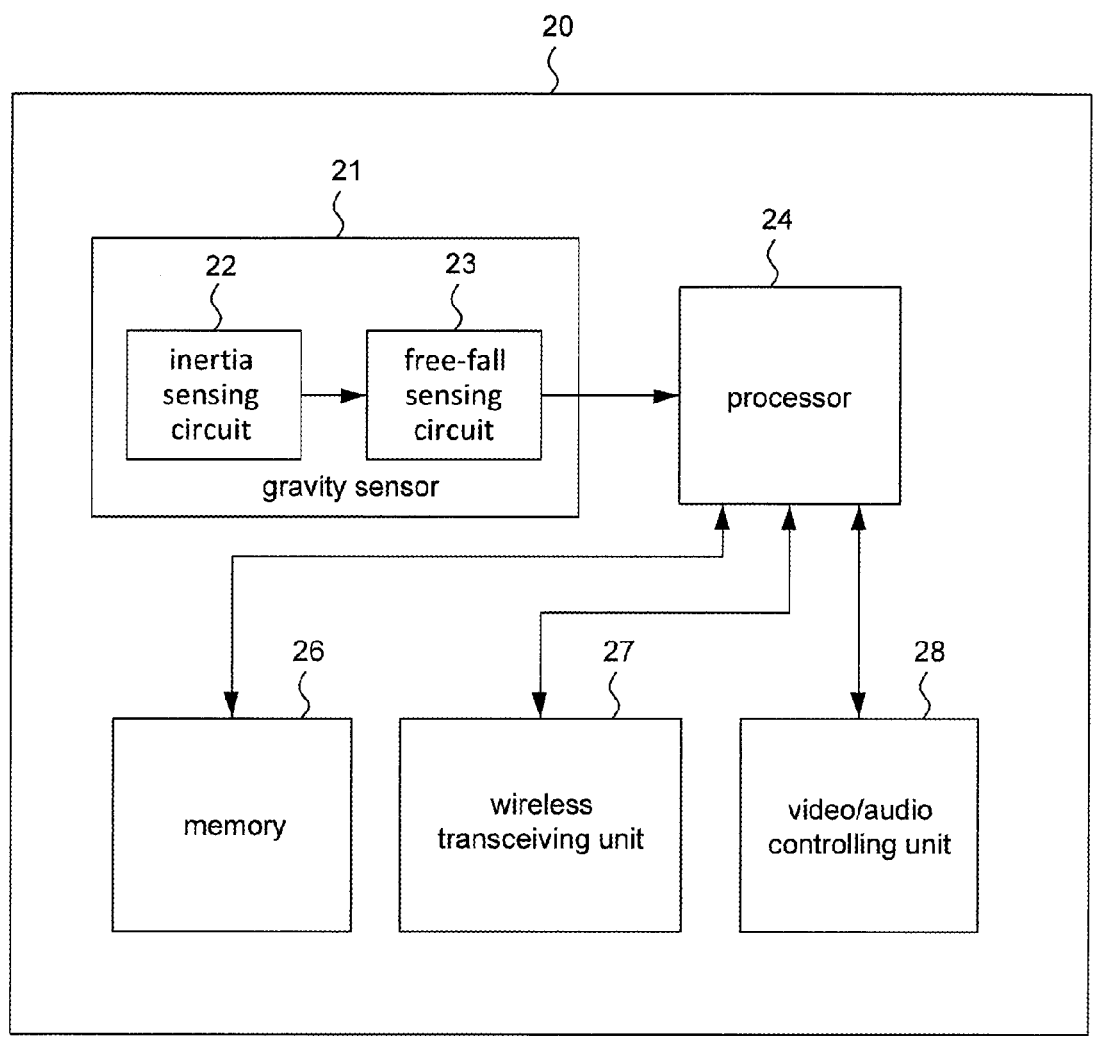
FIG. 3 shows a block diagram of a mobile device manufactured according to an embodiment of the present invention.
Figure 4:
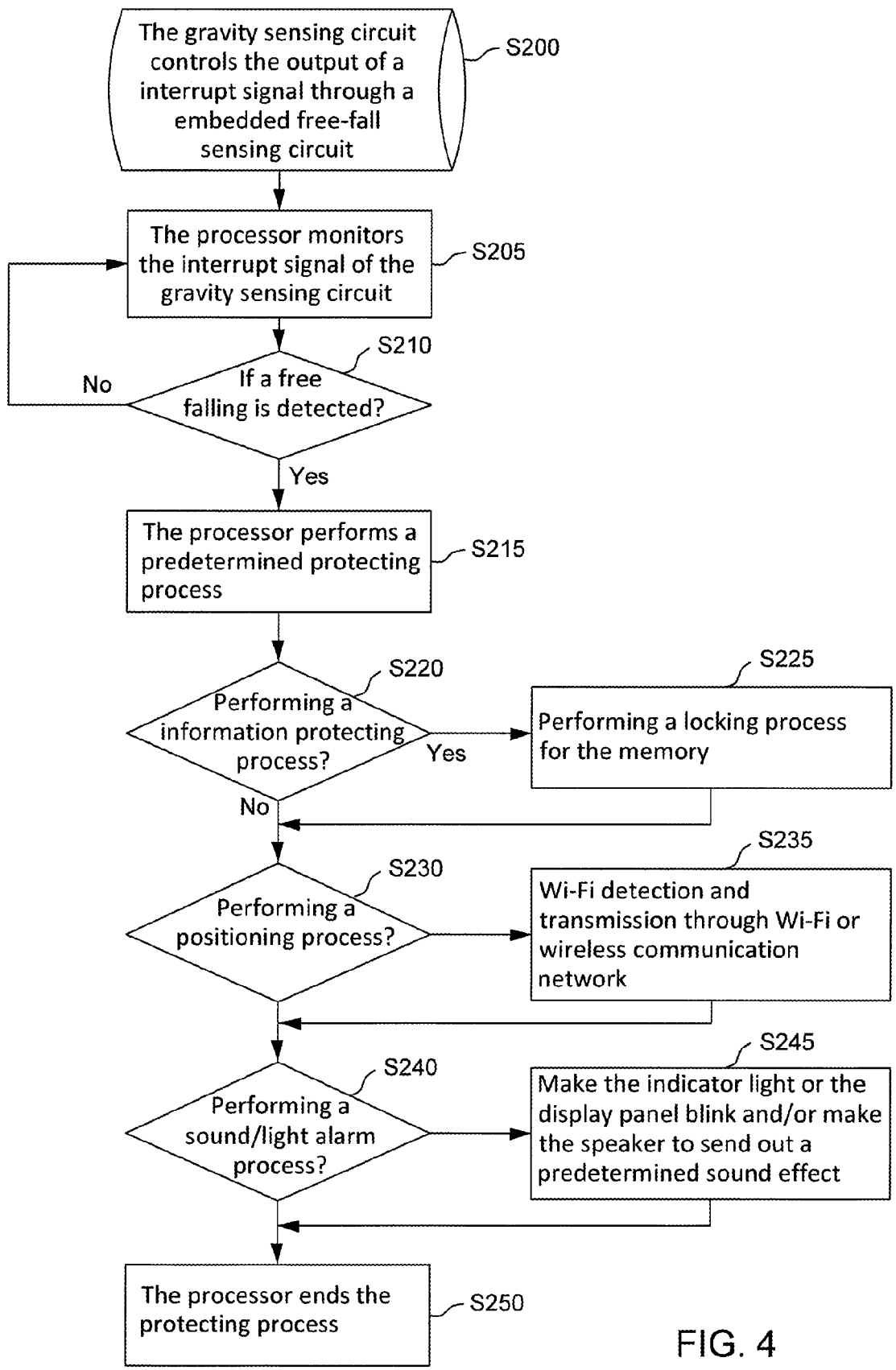
FIG. 4 shows a process flow performed by a mobile device according to another embodiment of the present invention.

Please refer to FIG. 3 and FIG. 4, wherein FIG. 3 shows a block diagram of a mobile device manufactured according to an embodiment of the present invention, and FIG. 4 shows a process flow performed by a mobile device according to another embodiment of the present invention. Here, for preventing from duplicate illustration, only the differences between the present embodiment and the previous embodiment are illustrated, but this is not intended to limit the present embodiment. The gravity sensor 21 of the mobile device 20 is the major element for detect a vertical free-fall motion which represents a falling. The exemplary gravity sensor 21 comprises a inertia sensing circuit 22 and a free-fall sensing circuit 23. The inertia sensing circuit 22, implemented by a integrated chip of a three-axes accelerometer here, senses inertia data along three directions, X, Y and Z axis. The free-fall sensing circuit 23 outputs a interrupt signal according to inertia data (Step S200) to indicate a vertical free-fall motion and the timing it occurred. The exemplary free-fall sensing circuit 23 used here is a free-fall sensing circuit embedded in the sensor chip. Then, the processor 24 receives the interrupt signal (Step S205), and according to the interrupt signal, a memory 26, a wireless transceiving unit 27 and a video/audio controlling unit 18 are controlled. The memory 26 stores at least one personal information therein. When the interrupt signal reveals a vertical free-fall motion (Step S210), the processor 24 performs at least one of the three protecting processes: information protecting process, positioning process and sound/light alarm process (Step S215). Similar to the previous embodiment, the control memory 26 performs a locking process to lock the personal information o become inaccessible (Steps S220 and S225), controls the wireless transceiving unit 27 to send out a warning message or E-mail to a predetermined E-mail server or the wireless transceiving unit of another mobile device (Steps S230 and S235) and controls the video/audio controlling unit 28 to send out a sound/light effect to draw the owner's attention (Step S240 and S245). Then, the processor ends the protecting process (Step S250).

Therefore, it is clear that the mobile device of the present invention counts on a free-fall sensing circuit or a algorithm embedded in either the gravity sensor or the processor to detect a vertical free-fall motion according to the sensed inertia data, and then controls the setting of the personal information to protect the personal information.

It is to be understood that these embodiments are not meant as limitations of the invention but merely exemplary descriptions of the invention with regard to certain specific embodiments. Indeed, different adaptations may be apparent to those skilled in the art without departing from the scope of the annexed claims. For instance, it is possible to add bus buffers on a specific data bus if it is necessary. Moreover, it is still possible to have a plurality of bus buffers cascaded in series.

What is claimed is:

1. A mobile device, comprising:
a gravity sensor for sensing inertia data along a direction;
a processor for receiving the inertia data and performing a free-fall sensing algorithm;
a memory, storing at least one personal information under the control of the processor; and
a wireless transceiving unit coupling to the processor and operating under the control of the processor;
wherein the processor controls the memory to lock the personal information to become inaccessible whenever a vertical free-fall motion is detected by the free-fall sensing algorithm, and the processor controls the wireless transceiving unit to transmit position data to a predetermined E-mail server whenever a vertical free-fall motion is detected by the free-fall sensing algorithm.

2. The mobile device according to claim 1, wherein the wireless transceiving unit comprises a Wi-Fi protocol module, a position system module, a global mobile communication system module, a general packet radio service module, a $3^{rd}$-generation module or a $4^{th}$-generation module.

3. The mobile device according to claim 1, wherein the position data is transmitted in the form of a text message.

4. The mobile device according to claim 1, wherein the wireless transceiving unit controlled by the processor performs a positioning process to obtain the position data.

5. The mobile device according to claim 1, wherein the processor controls the wireless transceiving unit to transmit position data to the wireless transceiving unit of another predetermined mobile device whenever a vertical free-fall motion is detected by the free-fall sensing algorithm.

6. The mobile device according to claim 5, wherein the position data is transmitted in the form of a text message.

7. The mobile device according to claim 5, wherein the wireless transceiving unit controlled by the processor performs a positioning process to obtain the position data.

8. The mobile device according to claim 1, further comprising a video/audio controlling unit coupling to the processor and operating under the control of the processor.

9. The mobile device according to claim 8, wherein the video/audio controlling unit comprises an indicator light, a display panel or a speaker.

10. The mobile device according to claim 1, further comprising a video/audio controlling unit coupling to the processor and operating under the control of the processor, wherein the processor controls the video/audio controlling unit to make a display panel blink whenever a vertical free-fall motion is detected by the free-fall sensing algorithm.

11. The mobile device according to claim 1, further comprising a video/audio controlling unit coupling to the processor and operating under the control of the processor, wherein the processor controls the video/audio controlling unit to make a indicator light blink whenever a vertical free-fall motion is detected by the free-fall sensing algorithm.

12. The mobile device according to claim 1, further comprising a video/audio controlling unit coupling to the processor and operating under the control of the processor, wherein the processor controls the video/audio controlling unit to have a speaker send out a predetermined sound effect whenever a vertical free-fall motion is detected by the free-fall sensing algorithm.

13. The mobile device according to claim 1, wherein the gravity sensor comprising an accelero-micro sensor or a gravity sensor.

14. The mobile device according to claim 1, wherein the memory comprises a flash memory or a memory card.

15. A mobile device, comprising:
a gravity sensor, comprising an inertia sensing circuit and a free-fall sensing circuit, the inertia sensing circuit sensing inertia data along a direction, and the free-fall sensing circuit outputting an interrupt signal according to the inertia data;
a memory, storing at least one personal information;
a processor for receiving the interrupt signal and controlling the memory according to the interrupt signal; and
a wireless transceiving unit, coupling to the processor and operating under the control of the processor;
wherein the processor controls the memory to lock the personal information to become inaccessible whenever a vertical free-fall motion is revealed by the interrupt signal, and the processor controls the wireless transceiving unit to transmit position data to a predetermined E-mail server whenever a vertical free-fall motion is revealed by the interrupt signal.

16. The mobile device according to claim 15, wherein the wireless transceiving unit comprises a Wi-Fi protocol module, a position system module, a global mobile communication system module, a general packet radio service module, a 3rd-generation module or a 4th-generation module.

17. The mobile device according to claim 15, wherein the position data is transmitted in the form of a text message.

18. The mobile device according to claim 15, wherein the wireless transceiving unit controlled by the processor performs a positioning process to obtain the position data.

19. The mobile device according to claim 15, wherein the processor controls the wireless transceiving unit to transmit position data to the wireless transceiving unit of another predetermined mobile device whenever a vertical free-fall motion is revealed by the interrupt signal.

20. The mobile device according to claim 19, wherein the position data is transmitted in the form of a text message.

21. The mobile device according to claim 19, wherein the wireless transceiving unit controlled by the processor performs a positioning process to obtain the position data.

22. The mobile device according to claim 15, further comprising a video/audio controlling unit coupling to the processor and operating under the control of the processor.

23. The mobile device according to claim 22, wherein the video/audio controlling unit comprises an indicator light, a display panel or a speaker.

24. The mobile device according to claim 15, wherein the gravity sensor comprises an accelero-micro sensor or a gravity sensor.

25. The mobile device according to claim 15, wherein the memory comprises a flash memory or a memory card.

* * * * *